US011880161B2

(12) United States Patent
Shimatate et al.

(10) Patent No.: US 11,880,161 B2
(45) Date of Patent: Jan. 23, 2024

(54) IMAGE FORMING APPARATUS WITH GAS COOLING

(71) Applicant: FUJIFILM Business Innovation Corp., Tokyo (JP)

(72) Inventors: Yuta Shimatate, Kanagawa (JP); Koji Yoshitsugu, Kanagawa (JP); Kazunari Ishii, Kanagawa (JP); Shunsuke Yamasaki, Kanagawa (JP); Yasuhisa Gonda, Kanagawa (JP); Naoki Sambe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/902,115

(22) Filed: Sep. 2, 2022

(65) Prior Publication Data

US 2023/0305487 A1 Sep. 28, 2023

(30) Foreign Application Priority Data

Mar. 24, 2022 (JP) ................................. 2022-048473

(51) Int. Cl.
*G03G 21/00* (2006.01)
*G03G 21/20* (2006.01)
*G03G 15/20* (2006.01)

(52) U.S. Cl.
CPC ....... *G03G 21/206* (2013.01); *G03G 15/2017* (2013.01); *G03G 2221/1645* (2013.01)

(58) Field of Classification Search
CPC ............. G03G 15/2017; G03G 15/161; G03G 21/206; G03G 21/12; G03G 2221/1645; G03G 2215/1661
USPC ...................................................... 399/92, 93
See application file for complete search history.

(56) References Cited

U.S. PATENT DOCUMENTS 4,891,678 A * 1/1990 Ishizu .................. G03G 21/169 399/360
5,166,727 A * 11/1992 Miyamoto ............. G03G 21/12 165/47
2011/0026964 A1* 2/2011 Yasumoto ............ G03G 21/206 399/94
2014/0147160 A1* 5/2014 Konishi ............... G03G 21/206 399/92
2018/0307163 A1* 10/2018 Kishi ................. G03G 15/2017
2020/0117128 A1* 4/2020 Matsuno ............ G03G 15/2053

FOREIGN PATENT DOCUMENTS

JP 05-142911 A 6/1993
JP 11-095644 A 4/1999

* cited by examiner

*Primary Examiner* — Robert B Beatty
(74) *Attorney, Agent, or Firm* — Sughrue Mion, PLLC

(57) ABSTRACT

An image forming apparatus includes: an image forming section that forms, with a developer containing toner, a toner image on a recording material; a fixing unit that fixes a toner image formed at the image forming section to a recording material; a recovery unit that recovers waste powder containing toner discharged from the image forming section; and a gas circulation unit in which gas for cooling the vicinity of the image forming section or the vicinity of the fixing unit circulates and that has a portion disposed between the recovery unit and the fixing unit.

12 Claims, 8 Drawing Sheets

IMAGE FORMING APPARATUS WITH GAS COOLING

CROSS-REFERENCE TO RELATED APPLICATIONS

This application is based on and claims priority under 35 USC 119 from Japanese Patent Application No. 2022-048473 filed Mar. 24, 2022.

BACKGROUND

(i) Technical Field

The present disclosure relates to an image forming apparatus.

(ii) Related Art

Japanese Unexamined Patent Application Publication No. 11-95644 discloses an image forming apparatus including an airflow duct between a fixing unit and a cleaning unit.

SUMMARY

When a recovery unit that recovers waste powder containing the waste toner discharged from an image forming section faces such a fixing unit that fixes a toner image to a recording material, the waste powder may melt with the heat generated at the fixing unit, and adhesion of the waste powder may be caused.

Aspects of non-limiting embodiments of the present disclosure relate to suppressing adhesion of the waste powder that is recovered by a recovery unit from being caused, compared with the case where there is no member thermally insulating a fixing unit and the recovery unit from one another.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: an image forming section that forms, with a developer containing toner, a toner image on a recording material; a fixing unit that fixes a toner image formed at the image forming section to a recording material; a recovery unit that recovers waste powder containing toner discharged from the image forming section; and a gas circulation unit in which gas for cooling the vicinity of the image forming section or the vicinity of the fixing unit circulates and that has a portion disposed between the recovery unit and the fixing unit.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described with reference to the accompanying drawings.

Figure 1:
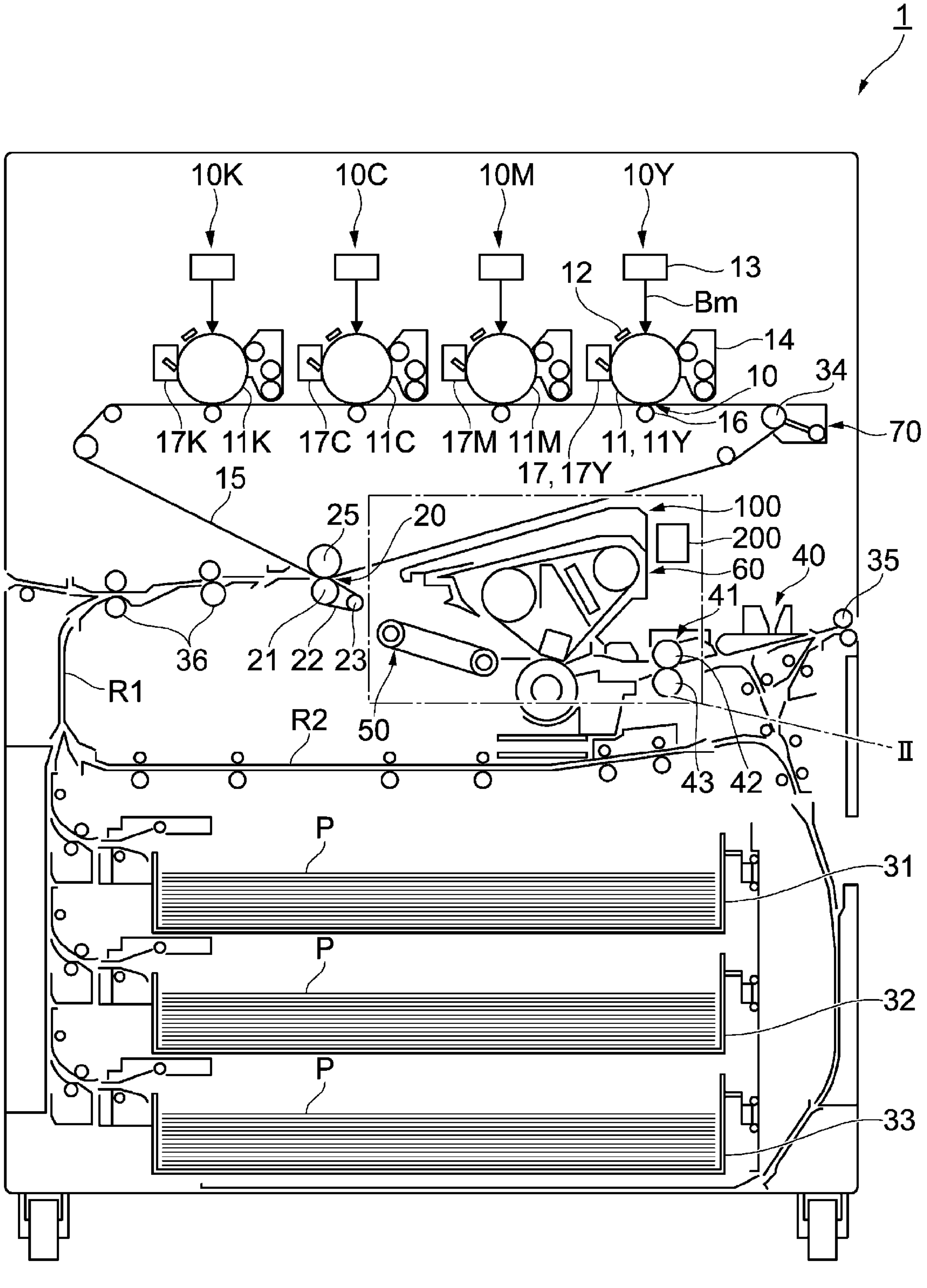
FIG. 1 illustrates schematically the configuration of an image forming apparatus to which the present exemplary embodiment is applied.
Figure 2:
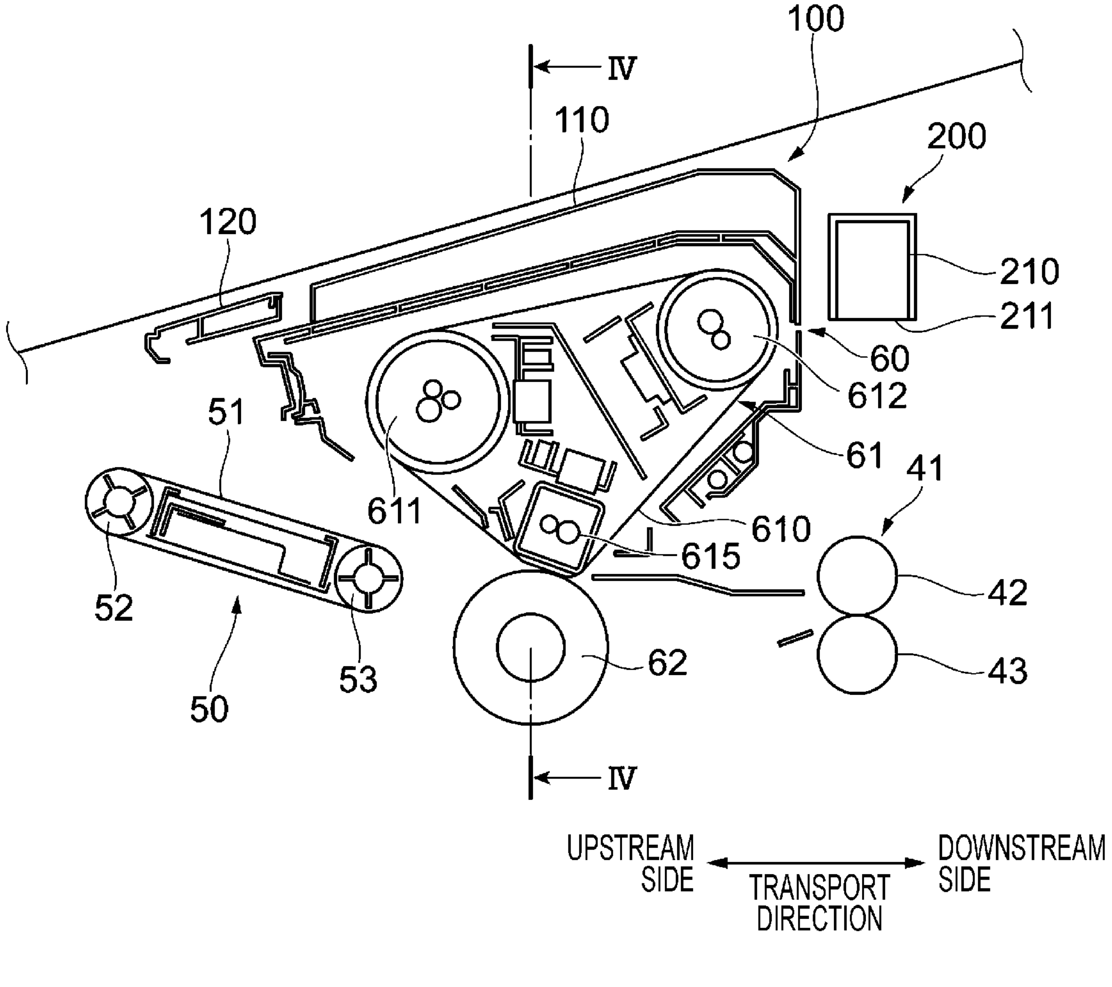
FIG. 2 is an enlarged view of part II in the image forming apparatus illustrated in FIG. 1.
Figure 3:
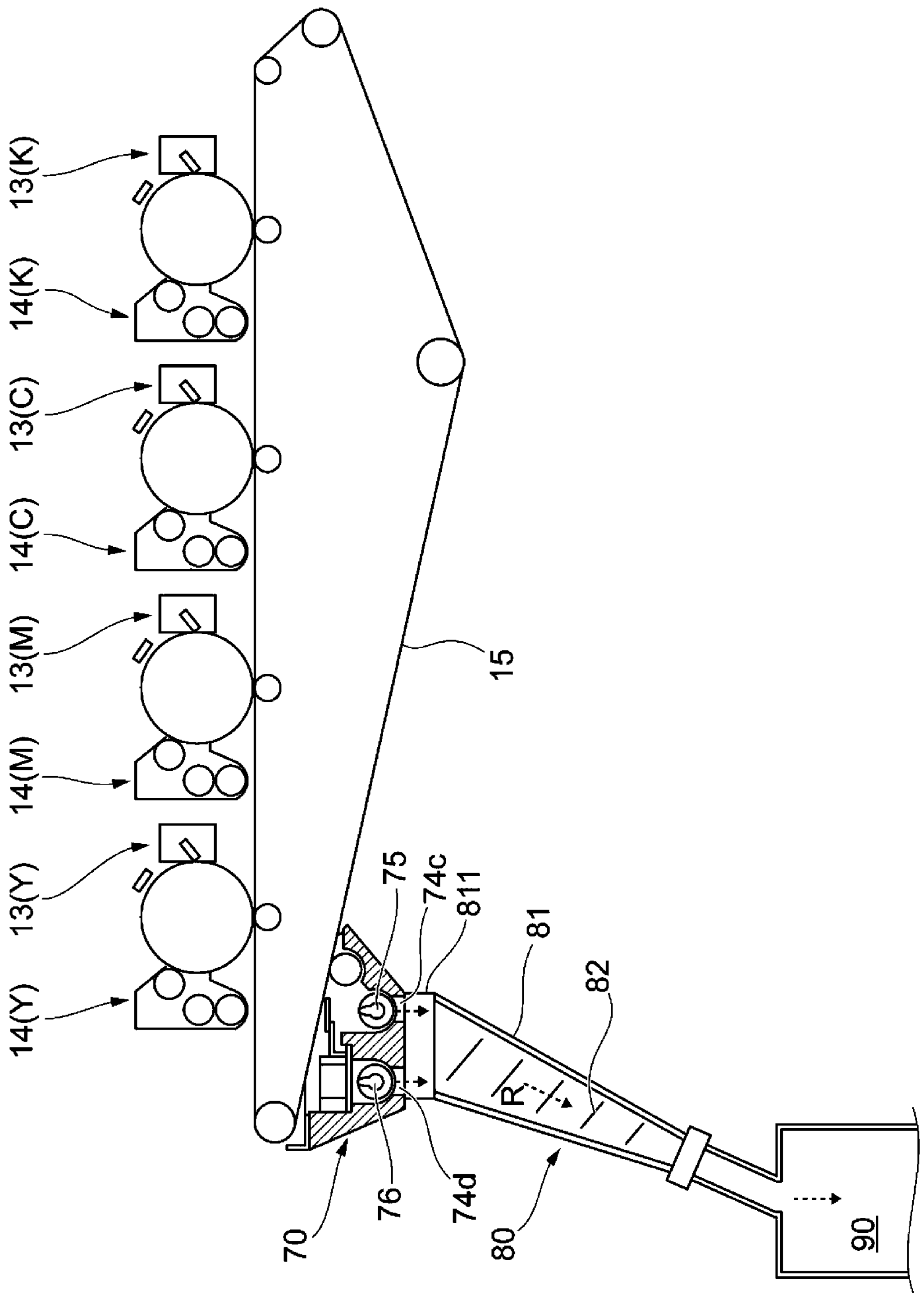
FIG. 3 illustrates an upper portion of the image forming apparatus viewed from the back side relative to the image forming apparatus.

FIG. 1 illustrates schematically the configuration of an image forming apparatus 1 to which the present exemplary embodiment is applied. FIG. 2 is an enlarged view of part II in the image forming apparatus 1 illustrated in FIG. 1. FIG. 3 illustrates an upper portion of the image forming apparatus 1 viewed from the back side relative to the image forming apparatus 1.

The image forming apparatus 1 illustrated in FIGS. 1 to 3 is a so-called tandem image forming apparatus employing an intermediate transfer system. The image forming apparatus 1 includes plural image forming units 10Y, 10M, 10C, and 10K that form, by an electrophotographic system, toner images of the respective color components.

The image forming units 10Y, 10M, 10C, and 10K form respectively images of yellow (Y), magenta (M), cyan (C), and black (K), and, hereinafter, the four colors are sometimes referred to as normal colors.

The image forming apparatus 1 further includes a first transfer part 10 in each of the image forming units 10Y, 10M, 10C, and 10K. The first transfer parts 10 first-transfer toner images of the four color components formed by the respective image forming units 10Y, 10M, 10C, and 10K, onto an intermediate transfer belt 15 in order. The image forming apparatus 1 further includes a second transfer part 20 that second-transfers, in a collective manner, the superimposed toner images that have been transferred onto the intermediate transfer belt 15, onto a sheet P, which is an example of a recording material.

Each of the image forming units 10Y, 10M, 10C, and 10K, which functions as an example of an image forming section, includes the following electrophotographic devices. In the vicinity of a photoconductor drum 11 that is rotated in the clockwise direction in FIG. 1, a charger 12 for charging the photoconductor drum 11 is provided. A laser exposure machine 13 that writes an electrostatic latent image on the photoconductor drum 11 is also provided. Note that an exposure beam emitted by the laser exposure machine 13 is denoted by Bm in FIG. 1. Note that, in the following description, the photoconductor drums 11 provided for the respective image forming units 10Y, 10M, 10C, and 10K are sometimes referred to as the photoconductor drums 11Y, 11M, 11C, and 11K.

There is further provided a developing device 14 in which a developer containing carrier and toner is accommodated and that visualizes, with the toner, the electrostatic latent image on the photoconductor drum 11. There is also provided a first transfer roller 16 that transfers the toner image of a corresponding color formed on the photoconductor drum 11 onto the intermediate transfer belt 15, at the first transfer part 10. In addition, a drum cleaner 17 that removes the residual toner on the photoconductor drum 11 is provided. The drum cleaner 17 is constituted by, for example, a cleaning blade that, while being in contact with the surface of the photoconductor drum 11, scrapes the waste powder containing the residual toner on the surface of the photoconductor drum 11. Note that, in the following description, the drum cleaners 17 provided for the respective image forming units 10Y, 10M, 10C, and 10K are sometimes referred to as the drum cleaners 17Y, 17M, 17C, and 17K.

The intermediate transfer belt 15 is circularly moved in the counterclockwise direction in FIG. 1 at a predetermined speed by a driving roller 34 driven by a motor, which is not illustrated. The first transfer part 10 includes, as a constituent, the first transfer roller 16 disposed so as to face the photoconductor drum 11 with the intermediate transfer belt 15 interposed therebetween. The toner images on the respective photoconductor drums 11 are then electrostatically attracted one by one to the intermediate transfer belt 15, and the superimposed toner images are formed on the intermediate transfer belt 15.

The second transfer part 20 is provided with: a second transfer roller 21, a belt member 22, and a support roller 23 that are disposed on the outer circumferential side of the intermediate transfer belt 15, that is, disposed on the side of a toner image holding surface. The second transfer part 20 is further provided with a backup roller 25 disposed on the inner circumferential side of the intermediate transfer belt 15. At the second transfer part 20, the belt member 22 is wound around and supported by the outer circumferential sides of the second transfer roller 21 and the support roller 23. In addition, at the second transfer part 20, the intermediate transfer belt 15 and the belt member 22 are arranged so that the outer circumferential surfaces thereof are in contact with one another. Moreover, at the second transfer part 20, the second transfer roller 21 is disposed so as to press the backup roller 25 with the belt member 22 and the intermediate transfer belt 15 interposed between the second transfer roller 21 and the backup roller 25. The second transfer roller 21 is grounded and forms a second transfer bias between the second transfer roller 21 and the backup roller 25, and the toner images formed on the intermediate transfer belt 15 are second-transferred onto the sheet P that has been transported to the second transfer part 20.

The image forming apparatus 1 further includes a fixing device 60, which is an example of a fixing unit that fixes the second-transferred toner images onto the sheet P.

The fixing device 60 is provided with a fixing belt module 61 and a pressure roller 62 that is pressed against the fixing belt module 61. The fixing device 60 is further provided with a driving motor M (refer to FIG. 6, which will be described later) positioned on the far side in the depth direction relative to the fixing belt module 61 and the pressure roller 62, and the driving motor M drives the fixing belt module 61 and the pressure roller 62. In the fixing device 60, the sheet P is pressed and heated at a position at which the fixing belt module 61 and the pressure roller 62 are in contact with one another, that is, at a fixing nip part, and the toner images are thus fixed to the sheet P.

The fixing belt module 61 is provided with a fixing belt 610 that is an endless belt, and support rollers 611 and 612 that are rotatably provided and support the fixing belt 610 from the inside of the fixing belt 610. The support roller 611 is rotated in the clockwise direction in FIG. 2 by receiving a driving force from a driving source, which is not illustrated. Due to the rotation of the support roller 611, the fixing belt 610 receives a driving force from the support roller 611 and is circularly moved in the clockwise direction in FIG. 2.

The fixing belt module 61 is further provided with a load receiving member 615 positioned so as to face the pressure roller 62 with the fixing belt 610 interposed between the load receiving member 615 and the pressure roller 62. The load receiving member 615 receives the load from the pressure roller 62. Regarding the fixing device 60 of the present exemplary embodiment, the pressure roller 62 and the load receiving member 615 hold the sheet P from both sides of the sheet P and apply pressure to the sheet P.

The fixing belt module 61 is further provided with a heater, which is not illustrated. The heater is disposed inside each of the support rollers 611 and 612 and the load receiving member 615 for heating.

The image forming apparatus 1 further includes a transport unit 50 that transports, toward the fixing device 60, the sheet P onto which the toner images have been second-transferred at the second transfer part 20.

The transport unit 50 is provided with a transport belt 51 that is an endless belt, and support rollers 52 and 53 that are rotatably provided and support the transport belt 51 from the inside of the transport belt 51. The support roller 52 is rotated in the clockwise direction in FIG. 2 by receiving a driving force from a driving source, which is not illustrated. Due to the rotation of the support roller 52, the transport belt 51 receives a driving force from the support roller 52 and is circularly moved in the clockwise direction in FIG. 2.

The image forming apparatus 1 further includes a cleaning device 70 that cleans a surface of the intermediate transfer belt 15. The cleaning device 70 cleans the waste powder containing the residual toner on the surface of the intermediate transfer belt 15.

The image forming apparatus 1 further includes a recovery device 80 that recovers the waste powder containing the toner removed from the photoconductor drums 11 by the drum cleaners 17Y, 17M, 17C, and 17K of the respective image forming units 10Y, 10M, 10C, and 10K, and the recovery device 80 also recovers the waste powder containing the toner removed from the intermediate transfer belt 15 by the cleaning device 70.

In the present exemplary embodiment, the cleaning device 70 and the recovery device 80 constitute a recovery unit that recovers the waste powder containing the toner discharged from the image forming section. Note that the configurations of the cleaning device 70 and the recovery device 80 will be described in detail later.

The image forming apparatus 1 further includes a blowing mechanism 100 through which gas for cooling the heat discharged from the fixing device 60 and for cooling the sheet P heated at the fixing device 60 circulates. The blowing mechanism 100 of the present exemplary embodiment has a first duct 110 and a second duct 120 that are adjacent to one another in the transport direction of a sheet P in the fixing device 60.

In the following description, the transport direction of a sheet P in the fixing device 60 is sometimes referred to simply as the transport direction of a sheet P or the transport direction.

The image forming apparatus 1 further includes an exhaust mechanism 200 disposed downstream of the fixing device 60 in the transport direction of a sheet P in an adjacent manner, and the exhaust mechanism 200 sucks air in the vicinity of the fixing device 60 and discharges the air outside the image forming apparatus 1. The exhaust mechanism 200 is an example of a gas circulation unit including a space through which gas for cooling the vicinity of the fixing device 60 circulates.

Note that the configuration of the exhaust mechanism 200 will be described in detail later.

The image forming apparatus 1 further includes a transport roller pair 41 that is constituted by a pair of rotatably provided transport rollers 42 and 43 and that transports the sheet P discharged from the fixing device 60 further downstream, and the image forming apparatus 1 also includes a guide section 40 that guides the sheet P transported by the transport roller pair 41.

The image forming apparatus 1 further includes a sheet discharge part 35 that discharges, outside the image forming apparatus 1, the sheet P that has passed through the guide section 40.

The image forming apparatus 1 further includes a sheet transport path R1 through which sheets are transported from sheet accommodation parts 31, 32, and 33 toward the sheet discharge part 35, via the second transfer part 20, the transport unit 50, the fixing device 60, the transport roller pair 41, and the guide section 40. The image forming apparatus 1 further includes a sheet inversion path R2 on which the sheet P that holds an image thereon and that has passed through the transport roller pair 41 is turned upside down and is transported toward the second transfer part 20 again.

The basic image formation processing of the image forming apparatus 1 will be described.

In the image forming apparatus 1, image data is output from, for example, an image reading device, which is not illustrated. The image data is then subjected to image processing performed by an image processing device, which is not illustrated. The image data is converted into color material gradation data of four colors: Y, M, C, and K and output to the laser exposure machines 13.

Regarding each of the laser exposure machines 13, the photoconductor drum 11 of a corresponding one of the image forming units 10Y, 10M, 10C, and 10K is radiated with the exposure beam Bm emitted from, for example, a semiconductor laser, according to the input color material gradation data. At each of the photoconductor drums 11, after the charger 12 has charged the surface of the photoconductor drum 11, the surface of the photoconductor drum 11 is scanned and exposed by the laser exposure machine 13, and an electrostatic latent image is thus formed. Then, after a toner image has been formed on the photoconductor drum 11 by the corresponding developing device 14, the toner image is transferred onto the intermediate transfer belt 15 at the first transfer part 10 at which a corresponding one of the photoconductor drums 11 and the intermediate transfer belt 15 are in contact with one another.

After the toner image has been first-transferred onto the surface of the intermediate transfer belt 15, the toner image is transported to the second transfer part 20 by the intermediate transfer belt 15 being moved. At the second transfer part 20, the second transfer roller 21 is pressed against the backup roller 25 with the belt member 22 and the intermediate transfer belt 15 interposed therebetween. At this time, the sheet P that has been transported from any one of the sheet accommodation parts 31, 32, and 33 by, for example, a transport roller 36 is held between the intermediate transfer belt 15 and the belt member 22.

The unfixed toner images held on the intermediate transfer belt 15 are then electrostatically transferred onto the sheet P in a collective manner at the second transfer part 20. Subsequently, the sheet P onto which the toner images have been electrostatically transferred is separated from the intermediate transfer belt 15 and is then transported to the transport unit 50 provided downstream, in the sheet transport direction, of the second transfer part 20. The sheet P that has been transported to the transport unit 50 is then transported to the fixing device 60 by the transport belt 51.

The fixing device 60 applies heat and pressure to the toner images on the sheet P that has been transported to the fixing device 60 and fixes the toner images onto the sheet P. The sheet P on which such a fixed image has been formed is then transported by the transport roller pair 41 to pass through the guide section 40 and is discharged outside the image forming apparatus 1 through the sheet discharge part 35.

On the other hand, the waste powder containing the toner adhering to each of the photoconductor drums 11 after the first transfer is removed by the corresponding drum cleaner 17. In addition, the waste powder containing the toner adhering to the intermediate transfer belt 15 after the second transfer is removed by the cleaning device 70. The waste powder that has been removed by each of the drum cleaners 17 and the cleaning device 70 is then recovered by the recovery device 80.

In this way, regarding the image formation processing at the image forming apparatus 1, the cycle is repeated as many times as the number of prints.

Figure 4:
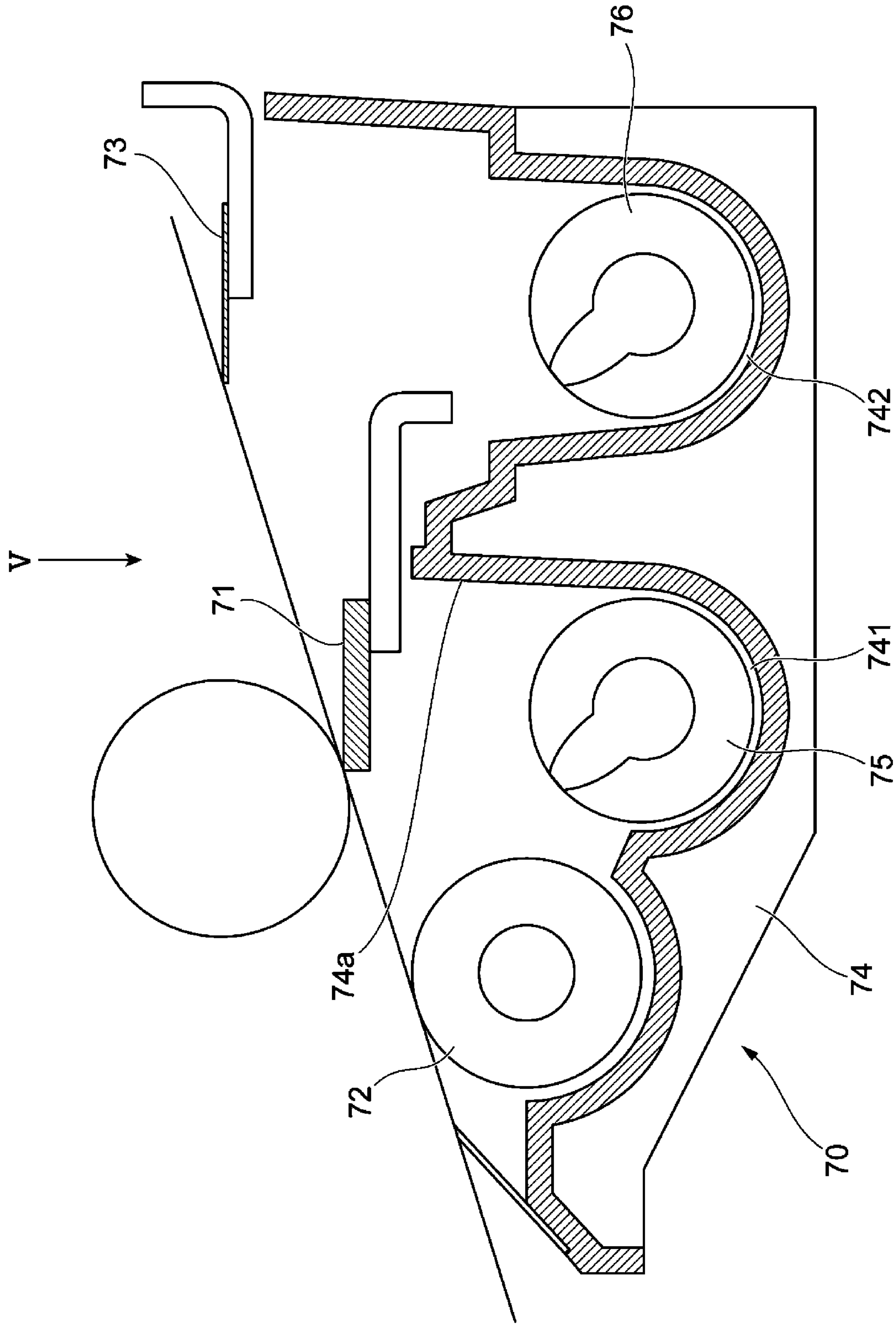
FIG. 4 is a schematic view for illustrating the configuration of a cleaning device and is a sectional view of the cleaning device taken along the face perpendicular to the depth direction of the image forming apparatus.
Figure 5:
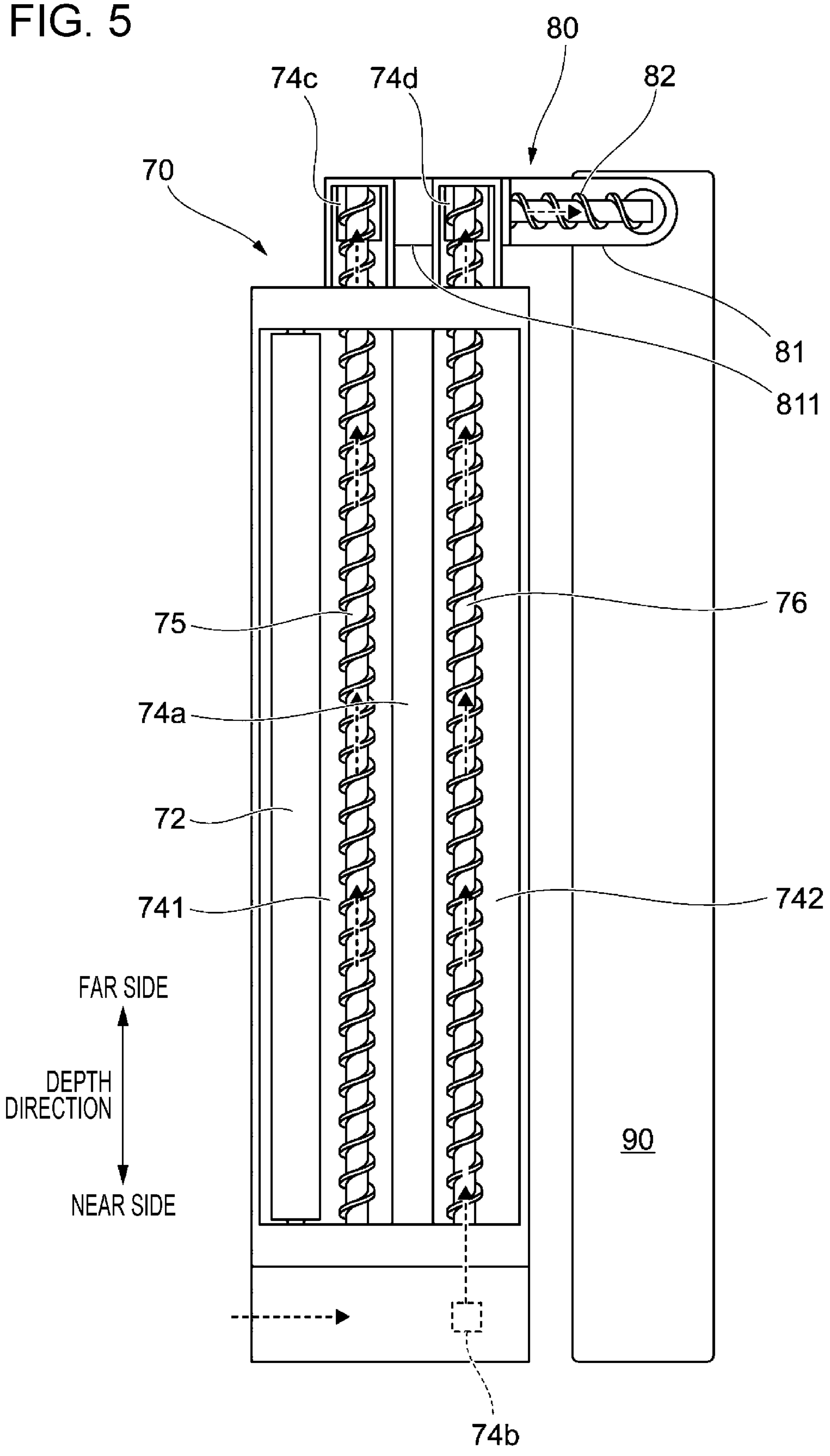
FIG. 5 illustrates the cleaning device viewed in a direction denoted by arrow V in FIG. 4.

Next, the cleaning device 70 of the present exemplary embodiment will be described. FIG. 4 is a schematic view for illustrating the configuration of the cleaning device 70 and is a sectional view of the cleaning device 70 taken along the face perpendicular to the depth direction of the image forming apparatus 1 (refer to FIG. 1). FIG. 5 illustrates the cleaning device 70 viewed in a direction denoted by arrow V in FIG. 4.

The cleaning device 70 includes a cleaning blade 71 that, while being in contact with the surface of the intermediate transfer belt 15, scrapes the waste powder remaining on the surface of the intermediate transfer belt 15. The cleaning device 70 further includes a cleaning brush 72 that, while being in contact with the surface of the intermediate transfer belt 15, rotates at a position upstream of the cleaning blade 71 in the moving direction of the intermediate transfer belt 15. The cleaning brush 72 causes the waste powder to come off the surface of the intermediate transfer belt 15 and facilitates the removal of the waste powder performed by the cleaning blade 71.

Note that, in the following description, the moving direction of the intermediate transfer belt 15 is sometimes referred to simply as the moving direction.

The cleaning device 70 further has a seal member 73 constituted by, for example, a thin plate-shaped metal. The seal member 73 is in contact with the intermediate transfer belt 15 at a position downstream of the cleaning blade 71 in the moving direction and seals the inside of the cleaning device 70 from the outside of the cleaning device 70. The seal member 73 also has a function of scraping the waste powder that has not been removed by the cleaning blade 71, off the intermediate transfer belt 15.

The cleaning device 70 further has a housing 74 in which the above-described members of the cleaning device 70 are accommodated and through which the waste powder is transported. The housing 74 includes a first transport path 741 and a second transport path 742 that are separated from one another by a partition wall 74*a*. The first transport path 741 and the second transport path 742 are formed so as to run in the depth direction of the image forming apparatus 1.

The housing 74 further has a reception part 74*b* provided so as to face an end portion, on the near side, of the second transport path 742, and the reception part 74*b* receives the waste powder removed, by the drum cleaner 17, from the photoconductor drum 11 of each of the image forming units 10. The housing 74 further has a first outlet 74*c* that is provided below an end portion, on the far side, of the first transport path 741 and from which the waste powder that has been transported through the first transport path 741 is discharged into a reception part 811 of the recovery device 80, which will be described later. The housing 74 further has a second outlet 74*d* that is provided below an end portion, on the far side, of the second transport path 742 and from which the waste powder that has been transported through the second transport path 742 is discharged into the reception part 811 of the recovery device 80.

The cleaning device 70 further includes a first transport member 75 that is provided in the first transport path 741 of the housing 74 and that transports waste powder. The first transport member 75 is constituted by, for example, an auger that extends in the depth direction and is driven to rotate by a driving source, which is not illustrated. Toward the first outlet 74*c*, the first transport member 75 transports, in the depth direction, the waste powder that has been removed from the surface of the intermediate transfer belt 15 by, for example, the cleaning blade 71.

The cleaning device 70 further includes a second transport member 76 that is provided in the second transport path 742 of the housing 74 and that transports waste powder. The second transport member 76 is constituted by, for example, an auger that extends in the depth direction and is driven to rotate by a driving source, which is not illustrated. Toward the second outlet 74*d*, the second transport member 76 transports, in the depth direction, the waste powder that has been removed from the photoconductor drum 11 of each of the image forming units 10 by the drum cleaner 17 and has been introduced into the housing 74 through the reception part 74*b*.

Next, the recovery device 80 of the present exemplary embodiment will be described with reference to FIG. 3 described above and other figures.

The recovery device 80 is provided in a back region in the image forming apparatus 1, and the recovery device 80 receives waste powder from the cleaning device 70 and transports, while stirring, the waste powder to a recovery container 90. The recovery device 80 is provided on the far side in the depth direction relative to a sheet transport region in which a sheet P may be transported in, for example, the second transfer part 20 and the fixing device 60.

In addition, the recovery device 80 has a recovery housing 81 through which the waste powder passes and a stirring member 82 that stirs the waste powder passing through inside the recovery housing 81.

The recovery housing 81 has a tubular shape including a space through which the waste powder passes, and the recovery housing 81 extends in the gravity direction. Note that such a state where the recovery housing 81 extends in the gravity direction means the state where the traveling direction of the waste powder passing through inside the recovery housing 81 has a gravity direction component.

The recovery housing 81 is disposed on the upper side in the gravity direction and has the reception part 811 that receives the waste powder discharged from the housing 74 of the cleaning device 70. The reception part 811 of the recovery housing 81 receives the waste powder discharged from the first outlet 74*c* and the second outlet 74*d* that are formed in the housing 74 of the cleaning device 70. Specifically, the reception part 811 receives the waste powder that is discharged from each of the first outlet 74*c* and the second outlet 74*d* and that falls in the gravity direction.

The stirring member 82 is constituted by, for example, an agitator extending in the axial direction of the recovery housing 81. The stirring member 82 advances and retreats inside the recovery housing 81 so as to vibrate by being driven by a driving source, which is not illustrated, and the stirring member 82 chips away the waste powder adhering to the inner wall of the recovery housing 81.

The recovery device 80 transports the waste powder discharged from the cleaning device 70 and received in the reception part 811 of the recovery housing 81, to the recovery container 90 by causing the waste powder to fall under gravity, while stirring with the stirring member 82, in the space inside the recovery housing 81.

Next, the exhaust mechanism 200 of the present exemplary embodiment will be described.

Figure 6:
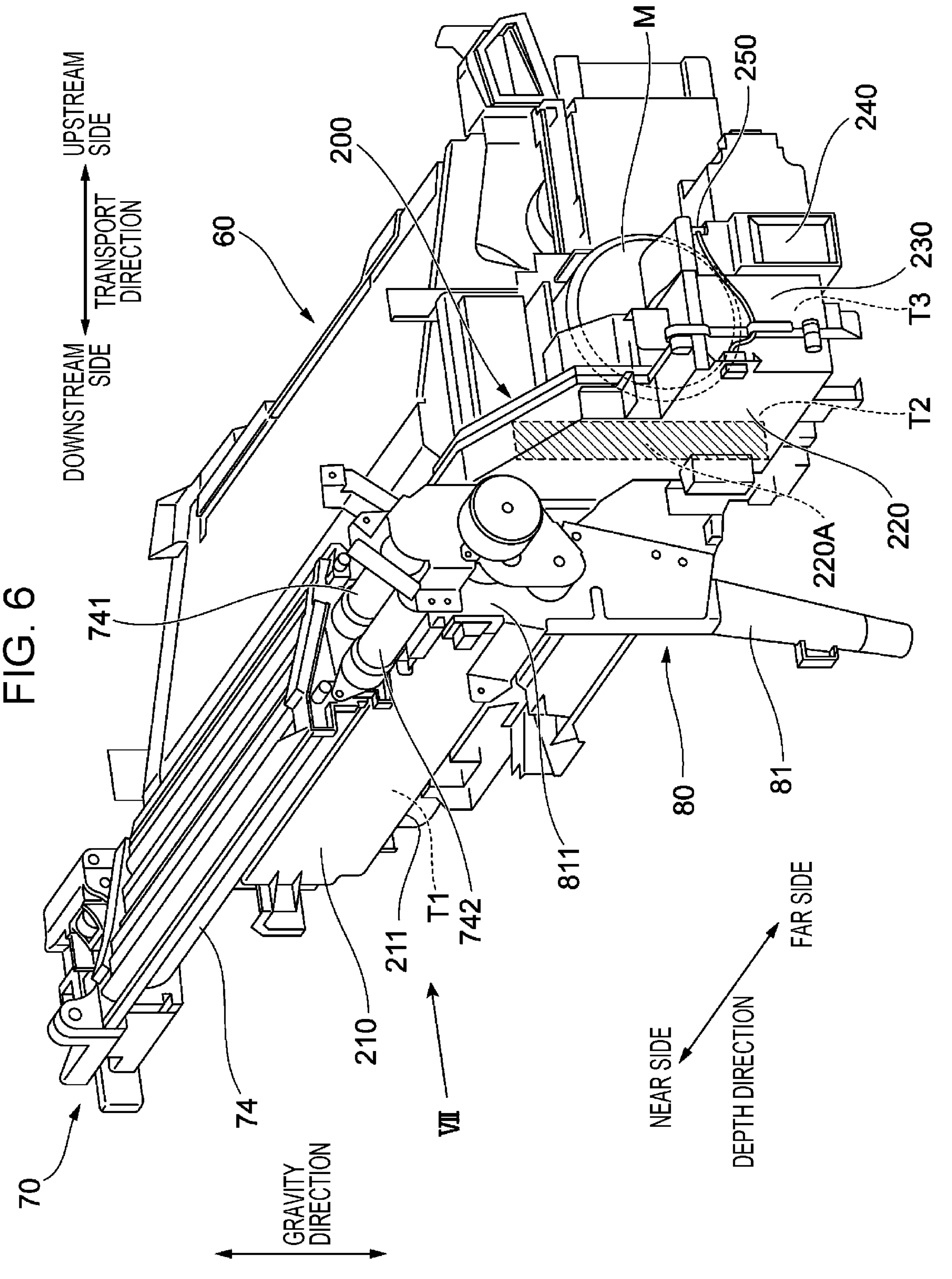
FIG. 6 illustrates a fixing device, the cleaning device, a recovery device, and an exhaust mechanism to which the present exemplary embodiment is applied and that are viewed from the back side relative to the image forming apparatus.
Figure 7:
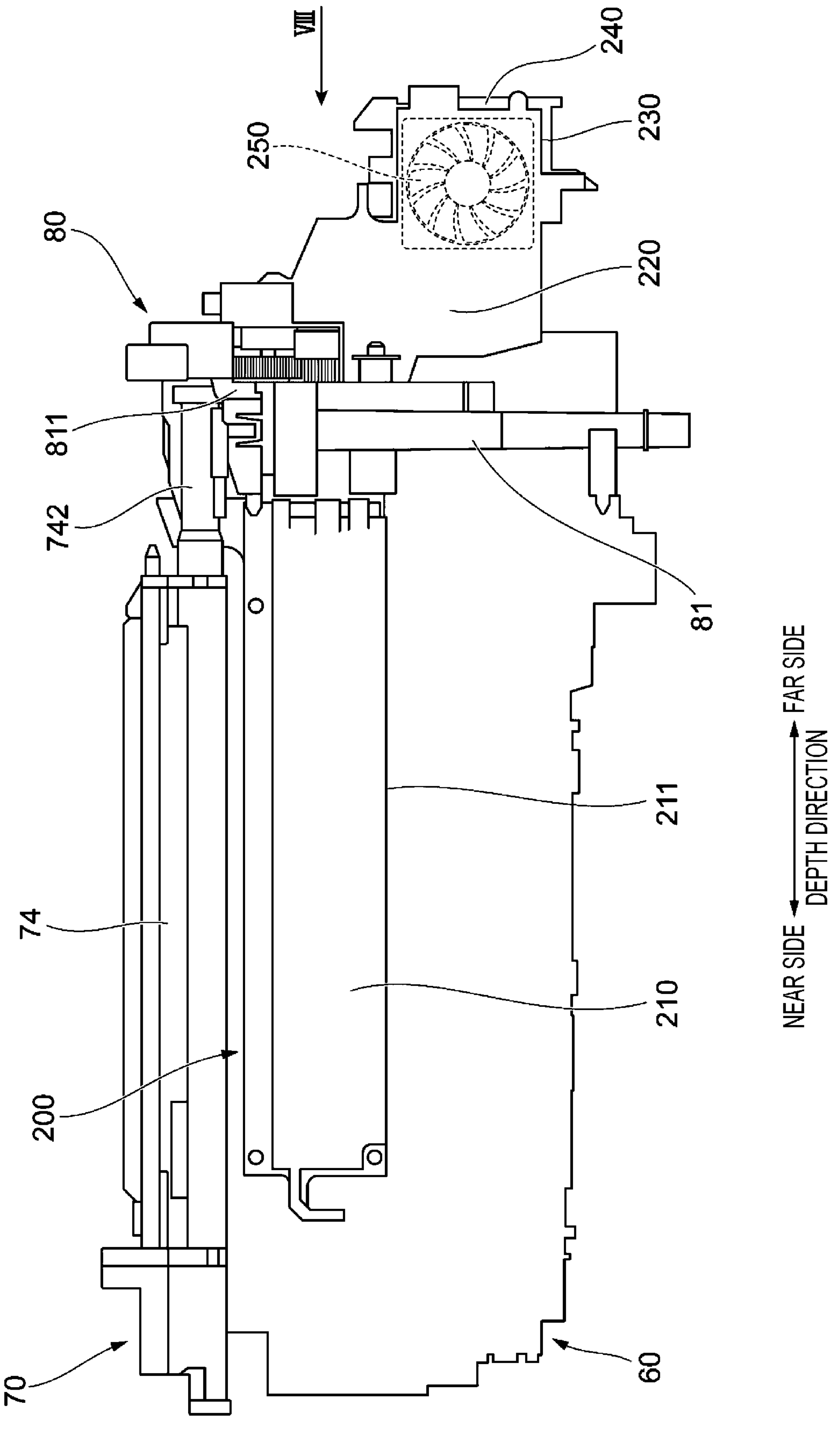
FIG. 7 illustrates the fixing device, the cleaning device, the recovery device, and the exhaust mechanism viewed in a direction denoted by arrow VII in FIG. 6.
Figure 8:
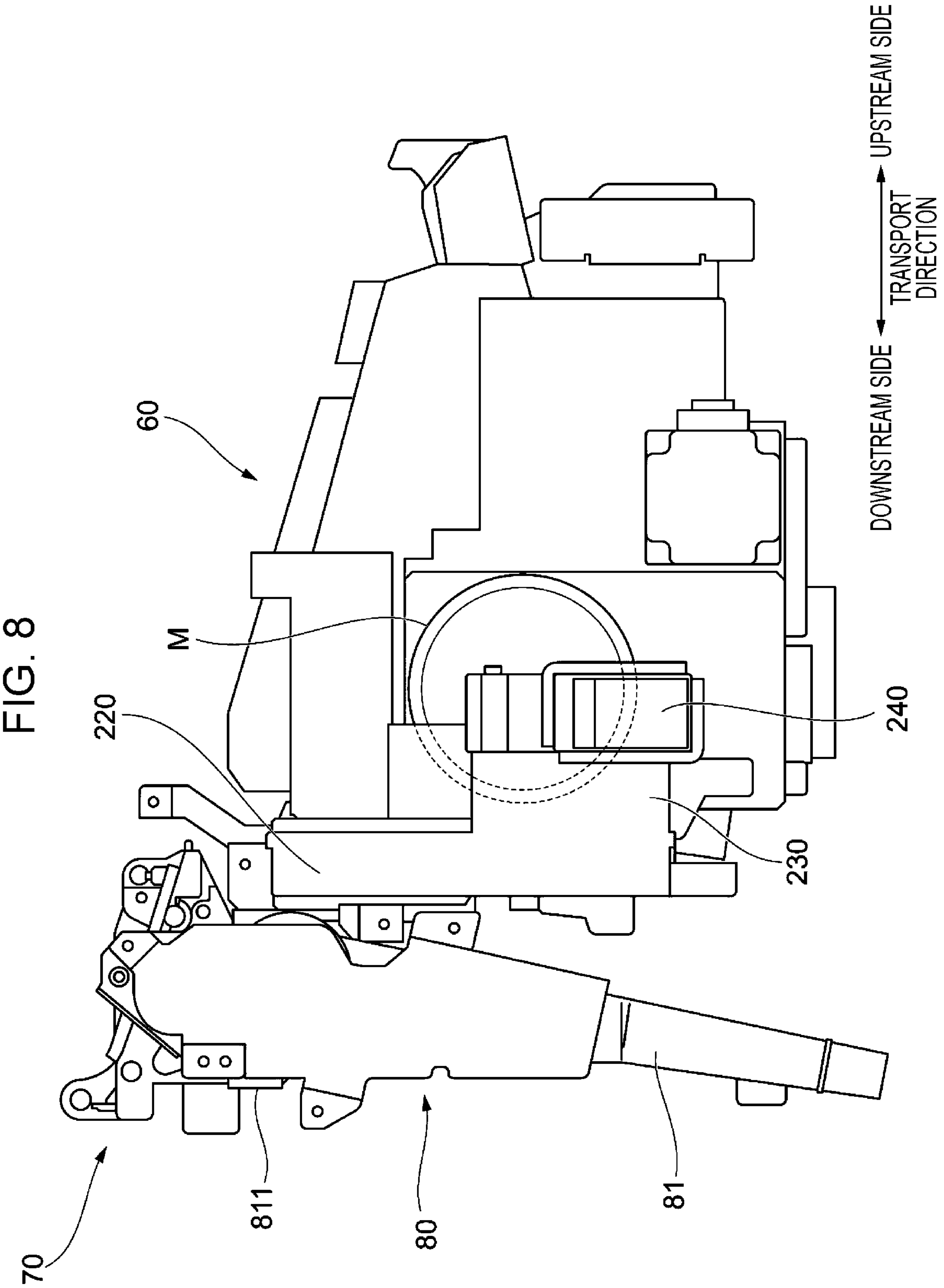
FIG. 8 illustrates the fixing device, the cleaning device, the recovery device, and the exhaust mechanism viewed in a direction denoted by arrow VIII in FIG. 7.

FIG. 6 illustrates the fixing device 60, the cleaning device 70, the recovery device 80, and the exhaust mechanism 200 to which the present exemplary embodiment is applied and that are viewed from the back side relative to the image forming apparatus 1. FIG. 7 illustrates the fixing device 60, the cleaning device 70, the recovery device 80, and the exhaust mechanism 200 viewed in a direction denoted by arrow VII in FIG. 6. FIG. 8 illustrates the fixing device 60, the cleaning device 70, the recovery device 80, and the exhaust mechanism 200 viewed in a direction denoted by arrow VIII in FIG. 7.

The exhaust mechanism 200 sucks gas from a space positioned downstream of the fixing device 60 in the transport direction and discharges the gas outside the image forming apparatus 1, thereby cooling the sheet P discharged from the fixing device 60 and cooling the vicinity of the fixing device 60.

The exhaust mechanism 200 has a suction part 210 that sucks the gas from the space positioned downstream of the fixing device 60 in the transport direction. The exhaust mechanism 200 further has a first circulation part 220 through which the gas that has been sucked by the suction part 210 circulates to the back side of the image forming apparatus 1 and a second circulation part 230 through which the gas that has passed through the first circulation part 220 circulates further upstream in the transport direction. The exhaust mechanism 200 further has an exhaust port 240 through which the gas that has passed through the second circulation part 230 is discharged outside the image forming apparatus 1 and a fan 250 that produces the flow of the gas flowing from the suction part 210, via the first circulation part 220 and the second circulation part 230, to the exhaust port 240. The exhaust mechanism 200 has a space through which gas circulates, inside each of the suction part 210, the first circulation part 220, and the second circulation part 230.

The suction part 210 extends in the depth direction in a space positioned downstream of the fixing device 60 in the transport direction. Specifically, the suction part 210 extends in the depth direction, at a position above the transport roller pair 41 that transports the sheet P discharged from the fixing device 60. More specifically, the suction part 210 faces the transport roller pair 41 with a gap interposed therebetween.

The suction part 210 as a whole has a cuboid shape being long in the depth direction. Inside the suction part 210, a space T1 through which gas circulates from the near side toward the far side in the depth direction is formed.

The suction part 210 further has a suction port 211 through which gas is sucked toward the space T1 formed inside the suction part 210. Although not being illustrated, plural suction ports 211 arranged in the depth direction with a gap therebetween are provided in the suction part 210. Each of the suction ports 211 is open downward in the gravity direction, toward the transport roller pair 41.

The first circulation part 220 extends in the depth direction from an end portion, on the far side, of the suction part 210. The first circulation part 220 is provided on the far side in the depth direction relative to a sheet transport region in which a sheet P is transported in, for example, the fixing device 60 and the transport roller pair 41. Although the detail will be described later, in the exhaust mechanism 200 of the present exemplary embodiment, a portion of the first circulation part 220 is disposed between the recovery device 80 and the fixing device 60.

In addition, the first circulation part 220 as a whole has a flat box shape extending in the depth direction and the gravity direction. Inside the first circulation part 220, on the far side in the depth direction relative to the space T1 of the suction part 210, a space T2 is formed continuously from the space T1 of the suction part 210.

The second circulation part 230 extends in the transport direction from an end portion, on the far side, of the first circulation part 220. Specifically, the second circulation part 230 extends upstream in the transport direction from the end portion, on the far side, of the first circulation part 220. The second circulation part 230 is provided on the far side in the depth direction relative to the fixing motor M of the fixing device 60.

The second circulation part 230 as a whole has a cuboid shape. Inside the second circulation part 230, on the upstream side in the transport direction relative to the space T2 of the first circulation part 220, a space T3 is formed continuously from the space T2 of the first circulation part 220.

The exhaust port 240 is provided in an upstream region, in the transport direction, of the second circulation part 230. Specifically, the exhaust port 240 is formed in the far-side face of the second circulation part 230 and is open to the far side in the depth direction, toward the outside of the image forming apparatus 1.

The fan 250 is provided inside the second circulation part 230. The fan 250 is driven to rotate by a driving source, which is not illustrated, and produces the flow of gas from the suction part 210, via the first circulation part 220 and the second circulation part 230, to the exhaust port 240.

Next, the operation of the exhaust mechanism 200 will be described.

When the vicinity of the fixing device 60 is cooled by using the exhaust mechanism 200, the fan 250 is driven to rotate by the driving source, which is not illustrated. Such a rotation of the fan 250 causes the gas sucked through the suction part 210 to circulate through the space T1 of the suction part 210, the space T2 of the first circulation part 220, and the space T3 of the second circulation part 230, and the vicinity of the fixing device 60 is thus cooled.

Specifically, gas is sucked into the space T1 inside the suction part 210, through the suction ports 211 of the suction part 210, from a space positioned downstream of the fixing device 60 in the transport direction, that is, more specifically, a space in the vicinity of the transport roller pair 41 through which the sheet P discharged from the fixing device 60 is transported.

The gas that has entered the space T1 of the suction part 210 then circulates in the space T1 from the near side to the far side in the depth direction. The gas that has reached the end portion, on the far side, of the suction part 210 then enters the space T2 of the first circulation part 220.

The gas that has entered the space T2 of the first circulation part 220 then circulates in the space T2 from the near side to the far side in the depth direction. The gas that has reached the end portion, on the far side, of the first circulation part 220 then enters the space T3 of the second circulation part 230.

The gas that has entered the space T3 of the second circulation part 230 then circulates in the space T3 from the downstream side to the upstream side in the transport direction. The gas that has reached the end portion, of the second circulation part 230, on the upstream side in the transport direction is then discharged outside the image forming apparatus 1 through the exhaust port 240.

In this way, according to the exhaust mechanism 200 of the present exemplary embodiment, the high-temperature gas in the vicinity of the fixing device 60 is discharged outside the image forming apparatus 1 through the suction part 210, the first circulation part 220, the second circulation part 230, and the exhaust port 240, and the fixing device 60 and the vicinity of the fixing device 60 are thereby cooled. In addition, the high-temperature sheet P discharged from the fixing device 60 and transported by the transport roller pair 41 is cooled.

Next, in the present exemplary embodiment, the relationship between the exhaust mechanism 200, the recovery device 80, and the fixing device 60 will be described.

The exhaust mechanism 200 of the present exemplary embodiment has a portion disposed between the recovery device 80 and the fixing device 60. More specifically, as figures such as FIG. 6 and FIG. 8 illustrate, the first circulation part 220 of the exhaust mechanism 200 is disposed between the recovery housing 81 of the recovery device 80 and the fixing motor M of the fixing device 60.

Note that, in the present exemplary embodiment, the state where "A has a portion disposed between B and C" means the state where A is positioned on a line connecting points that respectively exist in and are selected from B and C.

Here, when, regarding the recovery device 80, for example, the recovery housing 81 directly faces the fixing device 60, the waste powder transported inside the recovery housing 81 may melt due to the heat generated at the fixing device 60, and the adhesion of the waste powder inside the recovery housing 81 may thereby be caused.

In contrast, in the present exemplary embodiment, because having the portion disposed between the recovery device 80 and the fixing device 60, the exhaust mechanism 200 may block and thus insulate against the heat generated from the fixing device 60. Thus, in the present exemplary embodiment, the heat may hardly be transferred from the fixing device 60 to the recovery device 80, and the adhesion of the waste powder transported inside the recovery housing 81 may be suppressed from being caused, compared with the case where there is no portion thermally insulating the recovery device 80 and the fixing device 60 from one another.

In addition, the space T2 through which gas circulates is formed inside the first circulation part 220 of the exhaust mechanism 200. By such a configuration being adopted, in the present exemplary embodiment, a thermal insulating layer of the air inside the space T2 is formed between the recovery device 80 and the fixing device 60.

Thus, the heat may further hardly be transferred from the fixing device 60 to the recovery device 80, and the adhesion of the waste powder transported inside the recovery housing 81 may be further suppressed from being caused, compared with the case where, for example, a metal plate insulates the recovery device 80 and the fixing device 60 from one another.

In addition, in the present exemplary embodiment, the first circulation part 220 of the exhaust mechanism 200 is disposed between the recovery housing 81 of the recovery device 80 and the driving motor M that is a heat source of the fixing device 60. In particular, the driving motor M is a driving source that drives the fixing belt module 61 and the pressure roller 62 each of which is an example of a fixing member that heats or presses the sheet P on which a toner image is formed, thereby being likely to be hot. In the present exemplary embodiment, the exhaust mechanism 200 has the portion disposed between the recovery device 80 and the driving motor M of the fixing device 60, and the heat may thereby be hardly transferred from the fixing device 60 to the recovery device 80; thus, the adhesion of the waste powder transported inside the recovery housing 81 may be further suppressed from being caused, compared with the case where, for example, the exhaust mechanism 200 is disposed between parts other than the recovery device 80 and the driving motor M of the fixing device 60.

In addition, the recovery device 80 of the present exemplary embodiment receives waste powder from the cleaning device 70 and transports the waste powder to the recovery container 90 by causing the waste powder to fall under gravity inside the recovery housing 81. With such a configuration, when the adhesion of waste powder is caused, clogging with the waste powder and transport failure are likely to be caused inside the recovery housing 81, compared with the case where, for example, the waste powder is transported inside the recovery housing 81 by using a transport member such as a transport auger.

In the present exemplary embodiment, as described above, the heat may hardly be transferred from the fixing device 60 to the recovery device 80 due to the exhaust mechanism 200, and it may thereby be easy to suppress clogging with the waste powder and transport failure from being caused inside the recovery housing 81.

In addition, in the present exemplary embodiment, the exhaust mechanism 200 may have a portion disposed between the reception part 811 in the recovery housing 81 of the recovery device 80 and the fixing device 60. In this example, the first circulation part 220 of the exhaust mechanism 200 is disposed between the reception part 811 in the recovery housing 81 of the recovery device 80 and the fixing motor M of the fixing device 60.

As described above, the reception part 811 receives the waste powder that has been transported through each of the first transport path 741 and the second transport path 742 of the cleaning device 70 in the depth direction of the image forming apparatus 1 and has then fallen in the gravity direction from a corresponding one of the first outlet 74*c* and the second outlet 74*d*. Specifically, the reception part 811 is a portion at which the transport direction of the waste powder is changed from the depth direction to the gravity direction. Thus, when the adhesion of the waste powder is caused in the reception part 811, the waste powder builds up, and clogging with the waste powder and transport failure are thereby likely to be caused.

In the present exemplary embodiment, the exhaust mechanism 200 has the portion disposed between the reception part 811 and the fixing device 60, and the heat may thereby be hardly transferred from the fixing device 60 to the reception part 811; thus, the adhesion of the waste powder in the reception part 811 may be suppressed from being caused. Accordingly, it may be easy to suppress clogging with the waste powder and transport failure in the reception part 811 from being caused.

In addition, the exhaust mechanism 200 of the present exemplary embodiment sucks gas from the space positioned downstream of the fixing device 60 in the transport direction and discharges the gas through the exhaust port 240 to the far side in the depth direction, toward the outside of the image forming apparatus 1. In other words, the exhaust mechanism 200 of the present exemplary embodiment sucks gas from the space positioned downstream of the fixing device 60 in the transport direction and discharges the gas through the exhaust port 240 in a direction away from the recovery device 80.

By such a configuration being adopted, in the present exemplary embodiment, the high-temperature gas discharged from the exhaust port 240 may be suppressed from increasing the temperature of the recovery device 80, and the adhesion of the waste powder in the recovery device 80 may be further suppressed from being caused.

In addition, in the exhaust mechanism 200 of the present exemplary embodiment, as described above, the first circulation part 220 disposed between the recovery device 80 and the fixing device 60 has a flat shape extending in the gravity direction. More specifically, regarding the first circulation part 220, in the section perpendicular to the depth direction being the traveling direction of gas in the first circulation part 220, that is, in the section denoted by 220A in FIG. 6, the length in the gravity direction, which is an example of a direction extending along the recovery device 80, is larger than the length in the transport direction, which is an example of a direction from the recovery device 80 toward the fixing device 60.

By such a configuration being adopted, it may be possible to increase a region, in the first circulation part 220, insulating the recovery device 80 and the fixing device 60 from one another, and the heat may further hardly be transferred from the fixing device 60 to the recovery device 80. Thus, the adhesion of the waste powder in the recovery device 80 may be further suppressed from being caused.

Note that the above-described directions, such as the transport direction of waste powder in, for example, the recovery device 80 and the traveling direction of gas in the exhaust mechanism 200 are examples for description, and such directions are not limited to the examples of the directions in the above description. For example, the transport direction in which the waste powder is transported by using the recovery housing 81 of the recovery device 80 may not necessarily be the gravity direction, and the traveling direction of the gas in the first circulation part 220 of the exhaust mechanism 200 may not necessarily be the depth direction, as long as the relative positional relationship between the fixing device 60, the recovery device 80, and the exhaust mechanism 200 satisfies the above-described relationship.

The exemplary embodiment of the present disclosure has so far been described; however, the configurations described above are not limited to the configurations of the above-described exemplary embodiment and modification thereof and may be changed appropriately without departing from the spirit of the present disclosure. In other words, it is to be understood that the forms and the details may be variously changed without departing from the spirit and the scope of the claims.

For example, regarding each of the above-described configurations, a part may be omitted, or another function may be added.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

an image forming section that forms, with a developer containing toner, a toner image on a recording material;

a fixing unit that fixes a toner image formed at the image forming section to a recording material;

a recovery unit that recovers waste powder containing toner discharged from the image forming section; and a gas circulation unit in which gas for cooling a vicinity of the image forming section or a vicinity of the fixing unit circulates and that has a portion disposed between the recovery unit and the fixing unit, wherein, regarding the gas circulation unit, in a section perpendicular to a traveling direction of gas in the portion disposed between the recovery unit and the fixing unit, a length in a gravity direction extending along the recovery unit is larger than a length in a transport direction from the recovery unit toward the fixing unit, and wherein the traveling direction of gas in the portion disposed between the recovery unit and the fixing unit is a depth direction of the image forming apparatus, and the depth direction is perpendicular to the gravity direction and the transport direction.

2. The image forming apparatus according to claim 1, wherein the image forming section has an image holding body that holds a toner image to be transferred onto a recording material and that is circularly moved, the image forming apparatus further comprising a cleaning unit that cleans waste powder of the image holding body of the image forming section, wherein the recovery unit has a recovery container into which waste powder is recovered, and the recovery unit receives waste powder from the cleaning unit and transports the waste powder to the recovery container.

3. The image forming apparatus according to claim 2, wherein the recovery unit has a portion extending in the gravity direction, and the recovery unit receives waste powder from the cleaning unit and transports the waste powder by causing the waste powder to fall into the recovery container.

4. The image forming apparatus according to claim 3, wherein the recovery unit has a reception part that receives waste powder from the cleaning unit and transports the waste powder received in the reception part by causing the waste powder to fall into the recovery container, and wherein the gas circulation unit has a portion disposed between the reception part of the recovery unit and the fixing unit.

5. The image forming apparatus according to claim 1, wherein the fixing unit has a heat source that generates heat and that is positioned outside a transport region in which a recording material is transported, and wherein the gas circulation part has a portion disposed between the recovery unit and the heat source of the fixing unit.

6. The image forming apparatus according to claim 5, wherein the fixing unit has a fixing member that fixes a toner image to a recording material by heating or pressing the toner image, wherein the heat source of the fixing unit is a driving part that drives the fixing member, and wherein the gas circulation unit has a portion disposed between the recovery unit and the driving part of the fixing unit.

7. The image forming apparatus according to claim 1, wherein the gas circulation unit sucks gas from a space positioned downstream, of the fixing unit, in the transport direction of a recording material and discharges the gas outside a body of the image forming apparatus.

8. The image forming apparatus according to claim 7, wherein the gas circulation unit has: a suction part through which gas is sucked from the space positioned downstream, of the fixing device, in the transport direction of the recording material; an exhaust part through which the gas sucked through the suction part is discharged outside the body of the image forming apparatus; and a circulation part through which the gas circulates from the suction part toward the exhaust part, and wherein the circulation part has a portion disposed between the recovery unit and the fixing unit.

9. The image forming apparatus according to claim 8, wherein gas is discharged through the exhaust part of the gas circulation unit in the direction away from the recovery unit.

10. An image forming apparatus comprising:

image forming means for forming, with a developer containing toner, a toner image on a recording material;

fixing means for fixing a toner image formed at the image forming means to a recording material;

recovery means for recovering waste powder containing toner discharged from the image forming means; and gas circulation means in which gas for cooling a vicinity of the image forming means or a vicinity of the fixing means circulates and that has a portion disposed between the recovery means and the fixing means, wherein, regarding the gas circulation unit, in a section perpendicular to a traveling direction of gas in the portion disposed between the recovery unit and the fixing unit, a length in a gravity direction extending along the recovery unit is larger than a length in a transport direction from the recovery unit toward the fixing unit, and wherein the traveling direction of gas in the portion disposed between the recovery unit and the fixing unit is a depth direction of the image forming apparatus, and the depth direction is perpendicular to the gravity direction and the transport direction.

11. The image forming apparatus according to claim 1, wherein the gas circulation unit comprises a suction part that is extended along the depth direction from the section, and wherein the length in the gravity direction of the section is greater than a length of the suction part in the gravity direction.

12. The image formatting apparats according to claim 10, wherein the recovery unit comprises an auger configured to transport the waste powder along the depth direction to a recovery housing of the recovery unit configured to receive the waste powder falling therein along the gravity direction, wherein the recovery unit comprises a stirring member configured to drive the waste powder through the recovery housing along the gravity direction, and wherein the auger is higher in the gravity direction than the fixing unit.

* * * * *